US 10,739,048 B2

(12) United States Patent
Stark et al.

(10) Patent No.: US 10,739,048 B2
(45) Date of Patent: Aug. 11, 2020

(54) REFRIGERATING SYSTEM AND PURIFICATION METHOD FOR THE SAME

(71) Applicant: Carrier Corporation, Farmington, CT (US)

(72) Inventors: Michael A. Stark, Shanghai (CN); Haitao Zhang, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 79 days.

(21) Appl. No.: 15/741,006

(22) PCT Filed: Jun. 28, 2016

(86) PCT No.: PCT/US2016/039757
§ 371 (c)(1),
(2) Date: Dec. 29, 2017

(87) PCT Pub. No.: WO2017/004009
PCT Pub. Date: Jan. 5, 2017

(65) Prior Publication Data
US 2018/0187935 A1 Jul. 5, 2018

(30) Foreign Application Priority Data
Jun. 30, 2015 (CN) .......................... 2015 1 0384650

(51) Int. Cl.
F25B 43/04 (2006.01)
F25B 45/00 (2006.01)
(Continued)

(52) U.S. Cl.
CPC .......... *F25B 43/043* (2013.01); *F25B 39/028* (2013.01); *F25B 39/04* (2013.01);
(Continued)

(58) Field of Classification Search
CPC ................................................. F25B 2345/002
See application file for complete search history.

(56) References Cited

U.S. PATENT DOCUMENTS 3,082,610 A 3/1963 Marlo
4,476,688 A 10/1984 Goddard et al.
(Continued)

FOREIGN PATENT DOCUMENTS

CN 1791774 A 6/2006
CN 102027300 A 4/2011
(Continued)

OTHER PUBLICATIONS

AEC, "2-40 hp Portable Chillers", available at http://www.manualsdir.com/manuals/793339/aec-2-40-hp-portable-chillers.html, Nov. 1, 2003, 78 pages.
(Continued)

*Primary Examiner* — Ana M Vazquez
(74) *Attorney, Agent, or Firm* — Canton Colburn LLP

(57) ABSTRACT

The present invention provides a refrigerating system, including: a refrigerating loop, including a compressor, a condenser, a throttling element, and an evaporator that are connected in sequence through a pipeline; and a purification loop, connected to the refrigerating loop and configured to separate a pressure maintaining gas in the refrigerating loop; wherein the refrigerating loop is connected into the purification loop from the top of the condenser or the top of the compressor. The present invention further provides a purification method for a refrigerating system, including: in a first time period, performing S1: charging, into the refrigerating system, a refrigerant that satisfies a designed refrigerating capacity; and S2: charging a pressure maintaining gas into the refrigerating system, so that pressure in the refrigerating system is higher than atmospheric pressure; and in a second time period, performing S3: separating and (Continued)

discharging the pressure maintaining gas in the refrigerating system.

6 Claims, 1 Drawing Sheet

(51) Int. Cl.
  *F25B 39/02* (2006.01)
  *F25B 39/04* (2006.01)
  *F25B 41/06* (2006.01)

(52) U.S. Cl.
  CPC ............ *F25B 41/062* (2013.01); *F25B 45/00* (2013.01); *F25B 2345/001* (2013.01); *F25B 2345/002* (2013.01)

(56) References Cited

U.S. PATENT DOCUMENTS

| | | | |
|---|---|---|---|
| 4,683,724 A | 8/1987 | Vergel | |
| 4,864,829 A | 9/1989 | Manning et al. | |
| 4,984,431 A * | 1/1991 | Mount | F25B 45/00 62/85 |
| 6,996,998 B2 | 2/2006 | Lifson et al. | |
| 2011/0146801 A1 | 6/2011 | Kosco et al. | |
| 2013/0283832 A1 | 10/2013 | Kujak et al. | |

FOREIGN PATENT DOCUMENTS

| | | |
|---|---|---|
| CN | 102052810 A | 5/2011 |
| CN | 204240628 U | 4/2015 |
| EP | 0038958 A2 | 11/1981 |
| WO | 2015068455 A1 | 5/2015 |

OTHER PUBLICATIONS

ConAir, "New Portable Chillers", Jul. 30, 2013, 2 pages.
Delta T Systems, "Air Cooled Chillers, Water Cooled Chillers" accessed May 21, 2015, 3 pages.
International Search Report and Written Opinion for application PCT/US2016/039757, dated Sep. 1, 2016, 10 pages.
Trane, "EarthWise CenTraVac Industrial Liquid Chillers 165 to 3,950 Tons", 2002, American Standard Inc., 2 pages.
Trane, "Product Catalog, Series E CenTrac Chiller", Jan. 2015, 41 pages.
Chinese Office Action for application CN 201510384650.5, dated Dec. 13, 2019, 17 pages.

\* cited by examiner

REFRIGERATING SYSTEM AND PURIFICATION METHOD FOR THE SAME

TECHNICAL FIELD

The present invention relates to a refrigerating system, and in particular, to a refrigerating system having a purification apparatus and a purification method for the same.

RELATED ART

At present, there are various problems concerning maintenance and costs control during transportation of large-scale refrigeration equipment that uses a low-pressure refrigerant. For example, if the refrigerant is charged in advance or internal space of the equipment is kept relatively vacuum in a production plant, atmosphere or moisture contained in the atmosphere easily permeates into the refrigeration equipment when the equipment is transported to a settlement location required by a customer due to a low-pressure feature of a pipeline of the equipment, which leads to erosion of metal materials inside the refrigeration equipment. In another case, as shown in the patent application WO2015/068455, a pressure maintaining gas is first charged into the whole equipment in a production plant, which can guarantee a relatively stable transportation process. However, the pressure maintaining gas needs to be pumped out at the settlement location required by the customer, and a refrigerant is then charged into the equipment. In this case, on one hand, normalization of operating personnel and an operation process cannot be ensured, and it is hard to guarantee charging quality; on the other hand, it requires higher material purchasing costs than centralized refrigerant charging in the production plant. Therefore, how to guarantee safety during transportation of the refrigeration equipment while making sure that costs and operations are controllable becomes an urgent problem to be solved by persons skilled in the art.

In addition, if the pressure maintaining gas or another gas is already charged into the refrigeration equipment, the corresponding gas needs to be pumped out from the pipeline of the refrigeration equipment before the equipment officially runs, to avoid affecting performance of the equipment. How to separate these gases from the refrigerant and discharge these gases also needs to be solved. For example, as shown in the Chinese patent CN104471331, the patent provides a suite of purification equipment connected to a refrigerating system, and discloses refrigerant purification implemented by means of gas separation. Although this principle is feasible, design of a specific connection manner (for example, a gas pump-out position and a gas returning position) in which the suite of equipment is connected to the refrigerating system in an actual operation process is still constantly optimized, so as to achieve a better purification effect. This is also a technical problem that persons skilled in the art need to solve.

SUMMARY

An objective of the present invention is to provide a specific design for connection between a refrigerating system and a purification loop, so as to implement efficient and reliable separation of a refrigerant and a pressure maintaining gas.

Another objective of the present invention is to provide a purification method for a refrigerating system, so as to prevent problems of refrigerant leakage and equipment erosion during transportation of refrigeration equipment.

To achieve the aforementioned objectives or other objectives, the present invention provides the following technical solutions.

According to an aspect of the present invention, a refrigerating system is provided, including: a refrigerating loop, including a compressor, a condenser, a throttling element, and an evaporator that are connected in sequence through a pipeline; and a purification loop, connected to the refrigerating loop and configured to separate a pressure maintaining gas in the refrigerating loop, where the refrigerating loop is connected into the purification loop from a highest position or a local highest position of the refrigerating system.

According to another aspect of the present invention, a purification method for a refrigerating system is further provided, including: in a first time period, performing S1: charging, into the refrigerating system, a refrigerant that satisfies a designed refrigerating capacity; and S2: charging a pressure maintaining gas into the refrigerating system, so that pressure in the refrigerating system is higher than atmospheric pressure; and in a second time period, performing S3: separating and discharging the pressure maintaining gas in the refrigerating system.

DETAILED DESCRIPTION

Figure 1:
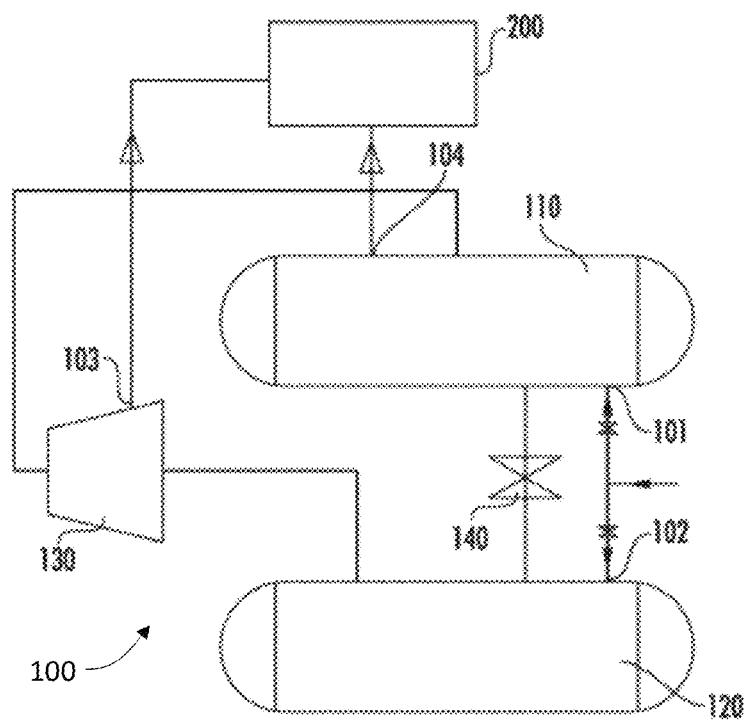
FIG. 1 is a system schematic diagram of an embodiment of a refrigerating system according to the present invention.
Figure 2:
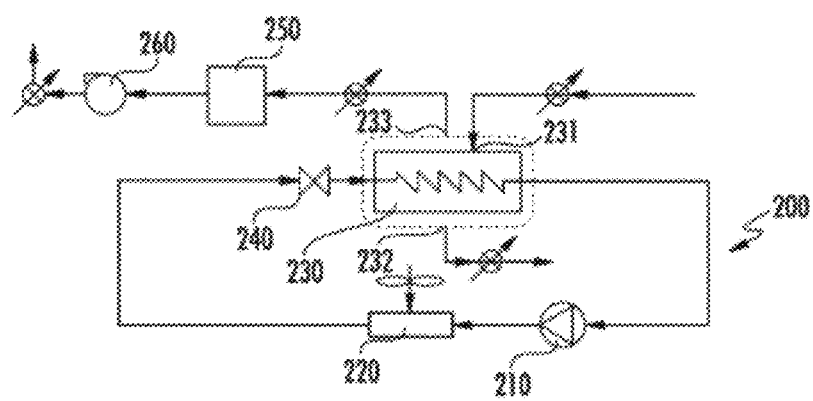
FIG. 2 is a schematic diagram of an embodiment of a purification loop in a refrigerating system according to the present invention.

Referring to FIG. 1 and FIG. 2, a refrigerating system is provided, including a refrigerating loop 100 and a purification loop 200. Considering a wide application range of refrigerant purification in this refrigerating system, the refrigerating loop 100 described herein may be a refrigerating loop of any regular large-scale refrigeration equipment, and generally includes a compressor 130, a condenser 110, a throttling element 140, and an evaporator 120 that are connected in sequence through a pipeline. Structures of the components in the refrigerating loop are not described in detail herein. The refrigerating system further includes the purification loop 200, which is configured to separate a pressure maintaining gas in the refrigerating loop 100. It should be noted herein that, generally, a refrigerating loop of a refrigerating system that is already put into use may include a refrigerant only. However, for a regular refrigerating system that has not been put into use yet, especially, for the unused refrigerating system in the present invention, because the interior of the pipeline of the refrigerating system is in a negative pressure state, the pressure maintaining gas is generally charged into the pipeline of the refrigerating system to prevent permeation of moisture or atmosphere and the consequent problem of component erosion. In such a case, if the refrigerating system needs to run normally, the pressure maintaining gas in the system further needs to be separated and discharged before the system runs.

After being charged into the system pipeline, such pressure maintaining gases usually accumulate at a highest position or a local highest position of the whole unit. Therefore, for the convenience of separation and purification of a purification system, the refrigerating loop 100 may be connected into the purification loop 200 from the highest position or the local highest position of the refrigerating system. It should be noted that, because the densities of the pressure maintaining gases or the density of air is generally lower than the density of the gaseous refrigerant, these gases theoretically accumulate at a highest point of the whole system after entering the system pipeline. However, these gases may also directly accumulate at a highest point in a component through which the gases enter the system (that is, the local highest position) in actual application depending on different charging points of the pressure maintaining gas and/or different specific positions at which air permeates into the system pipeline, but not necessarily flow to the highest position of the whole system along the pipeline.

The highest position of the whole system is generally the top of the compressor according to regular component layout of a large-scale unit, and a first charging port at the top of the condenser 110 and/or a second charging port 102 at the top of the evaporator 120 is usually selected as a regular pressure maintaining gas charging point. Therefore, most of these gases are usually gathered at an upper portion of the condenser or the top of the compressor. Therefore, an embodiment of the present invention proposes connecting the refrigerating loop 100 to the purification loop 200 through a first separation port 104 at the top of the condenser or a second separation port 103 at the top of the compressor thereof. This makes it easier to introduce a mixture of the refrigerant and the pressure maintaining gas into the purification loop 200, thus implementing separation of the pressure maintaining gas and the refrigerant in a more optimized manner, and further guaranteeing high performance during subsequent startup and operation of the unit.

In addition, the purification loop 200 may be connected back to the refrigerating loop 100 at the bottom of the condenser. Such design provides a height difference between a gas inlet 231 and a refrigerant outlet 232 of the purification loop 200, and when flowing back to the refrigerating loop 100, the separated refrigerant can flow back to the condenser smoothly under the driving of the gravity.

Out of the same purpose as described above, alternatively, the purification loop 200 may further be connected back to the refrigerating loop 100 at the bottom of the evaporator. In this case, the refrigerant is pushed by an additional pressure difference apart from the driving of the gravity, which improves the driving efficiency.

It should be noted that, the purification loop described in the present invention separates the refrigerant and the pressure maintaining gas, and a specific structure and separation principle thereof may have many forms. The present invention provides several possible purification loops herein to serve as options. However, according to the inspiration of the several manners provided herein as examples, persons skilled in the art should also think of other related possibilities, which are not illustrated below though.

FIG. 2 shows an implementation manner of the purification loop 200, which includes a purification compressor 210, a purification condenser 220, an expansion valve 240, and a low-temperature separator 230 that are connected in sequence through a pipeline. The purification loop 200 is bi-directionally connected to the refrigerating loop 100 through the low-temperature separator 230. More specifically, the low-temperature separator 230 exists as a fluid exchange medium between the purification loop 200 and the refrigerating loop 100. That is, the mixture of the refrigerant and the pressure maintaining gas flows into the low-temperature separator 230 from the refrigerating loop 100; after separation and purification by the low-temperature separator 230, the separated refrigerant flows back to the refrigerating loop 100 through the low-temperature separator 230, while the separated pressure maintaining gas is discharged to the atmosphere through the low-temperature separator 230.

This embodiment also provides specific design positions of openings in the low-temperature separator 230. For example, the low-temperature separator 230 has an inlet 231 located at the top of the low-temperature separator 230, a refrigerant outlet 232 located at the bottom of the low-temperature separator 230, and a pressure maintaining gas outlet 233 located at the top of the low-temperature separator 230. Due to a low temperature separation principle used in this embodiment, the refrigerant that is liquefied at a low temperature can easily flow back to the refrigerating loop 100 from the refrigerant outlet 232 arranged at a relatively low position, while the pressure maintaining gas that still maintains a gas state at the low temperature can be easily discharged to the atmosphere from the pressure maintaining gas outlet 233 arranged at a relatively high position. In addition, by arranging the inlet 231 at the top of the low-temperature separator 230, disturbance from the mixture of the refrigerant and the pressure maintaining gas to the liquid refrigerant accumulating at the bottom of the low-temperature separator 230 is also avoided, which further facilitates the purification operation of the purification loop.

In addition, the purification loop 200 further includes a discharge branch which is connected on the pressure maintaining gas outlet 233 of the low-temperature separator 230. A regeneration filter 250 and an air pump 260 are arranged on the discharge branch. The air pump 260 is configured to provide a pumping force for the pressure maintaining gas to be discharged, and the regeneration filter 250 is configured to filter traces of refrigerant mixed in the pressure maintaining gas, to prevent the traces of refrigerant from polluting the atmosphere after escaping. The regeneration filter 250 may release the absorbed refrigerant by means of heating or vacuumizing, to recover a filtering capability thereof, that is, to regenerate. Specifically, the regeneration filter may include, but is not limited to: an active carbon filter, a molecular sieve filter, a semi-permeable membrane filter, and the like.

Optionally, a switch valve or an opening valve may be arranged on each loop or branch to control on/off or opening of the flow path.

A separation operation process of the mixture of the refrigerant and the pressure maintaining gas in the equipment is described below with reference to the refrigerating system shown in FIG. 2.

Before the equipment runs, the pressure maintaining gas charged therein is generally located at a highest position or a local highest position inside the equipment, that is, at the top of the condenser or the top of the compressor. At this time, a purification operation of the equipment is started. On one hand, the mixture of the refrigerant and the pressure maintaining gas is pumped into the low-temperature separator 230 in the purification loop 200 from the top of the condenser or the top of the compressor. On the other hand, the purification compressor 210 in the purification loop 200 starts to work, so that a working refrigerant in the purification loop 200 is compressed by the purification compressor 210 and then flows through the purification condenser 220 so as to be condensed; subsequently, the working refrigerant is throttled by the expansion valve 240, and finally enters the low-temperature separator 230 to exchange heat with the mixture of the refrigerant and the pressure maintaining gas. After that, the working refrigerant flows back to the purification compressor 210, to start a new round of circle. After heat of the mixture of the refrigerant and the pressure maintaining gas is absorbed by the working refrigerant of the purification loop 200 and the temperature of the mixture is lowered, a refrigerant gas having a higher liquefaction temperature is condensed to be a refrigerant liquid that accumulates at a lower portion of the low-temperature separator 230, while the pressure maintaining gas having a lower liquefaction temperature still maintains a gas state and accumulates at an upper portion of the low-temperature separator 230. After that, the refrigerant liquid is recycled back to the refrigerating loop 100 through the refrigerant outlet 232 at the bottom of the low-temperature separator 230, while the pressure maintaining gas passes through the pressure maintaining gas outlet 233 at the top of the low-temperature separator 230 and is discharged to the atmosphere through the discharge branch.

As is described above, in the present invention, although an operation process of a refrigerating system having a purification loop 100 that uses a low temperature separation principle is described in detail herein with reference to FIG. 2, purification loops using other separation principles can also be applied to the present invention.

Alternatively, a purification loop (not shown) may include a booster pump and a pressurizing separator. The purification loop is bi-directionally connected to the refrigerating loop through the pressurizing separator. More specifically, the pressurizing separator exists as a fluid exchange medium between the purification loop and the refrigerating loop. That is, the mixture of the refrigerant and the pressure maintaining gas flows into the pressurizing separator from the refrigerating loop, and after separation and purification of the pressurizing separator, the separated refrigerant flows back to the refrigerating loop through the pressurizing separator, while the separated pressure maintaining gas is discharged to the atmosphere through the pressurizing separator.

For specific design positions of openings in the pressurizing separator, refer to the position design of the openings in the low-temperature separator 230 described above.

Optionally, a switch valve or an opening valve may be arranged on each loop or branch to control on/off or opening of the flow path.

A separation operation process of the mixture of the refrigerant and the pressure maintaining gas in the equipment is described below.

Before the equipment runs, the pressure maintaining gas charged therein is generally located at a highest position or a local highest position inside the equipment, that is, at the top of the condenser or the top of the compressor. At this time, a purification operation of the equipment is started. The mixture of the refrigerant and the pressure maintaining gas is pumped into the pressurizing separator in the purification loop from the top of the compressor or the top of the condenser, and pressure of the refrigerant and the pressure maintaining gas is increased by means of pressurizing processing. After that, a refrigerant gas having a higher liquefaction temperature is condensed to be a refrigerant liquid under a relatively low ambient temperature and the refrigerant liquid accumulates at a lower portion of the pressurizing separator, while the pressure maintaining gas having a lower liquefaction temperature still maintains a gas state and accumulates at an upper portion of the pressurizing separator. After that, the refrigerant liquid is cycled back to the refrigerating loop through a refrigerant outlet of the pressurizing separator, while the pressure maintaining gas passes through a pressure maintaining gas outlet of the pressurizing separator and is discharged to the atmosphere through the discharge branch.

More preferably, the low temperature separation and pressurizing separation may be combined to achieve a more excellent separation effect because in both manners, the refrigerant is liquefied to be separated from the pressure maintaining gas. For example, a cooling component for assisting in separation may be additionally designed in a purification loop having a pressurizing separator. Alternatively, a boosting component for assisting in separation may be additionally designed in a purification loop having a low-temperature separator.

In addition, alternatively, a purification loop (not shown) may further include a semi-permeable membrane separator, where the purification loop is bi-directionally connected to the refrigerating loop through the semi-permeable membrane separator. More specifically, the semi-permeable membrane separator exists as a fluid exchange medium between the purification loop and the refrigerating loop. That is, the mixture of the refrigerant and the pressure maintaining gas flows into the semi-permeable membrane separator from the refrigerating loop, and after separation and purification of the semi-permeable membrane separator, the separated refrigerant flows back to the refrigerating loop through the semi-permeable membrane separator, while the separated pressure maintaining gas is discharged to the atmosphere through the semi-permeable membrane separator. The semi-permeable membrane herein may selectively allow the refrigerant or the pressure maintaining gas to pass through, which is aimed at separating the two gases.

Optionally, a switch valve or an opening valve may be arranged on each loop or branch to control on/off or opening of the flow path.

A separation operation process of the mixture of the refrigerant and the pressure maintaining gas in the equipment is described below.

Before the equipment runs, the pressure maintaining gas charged therein is generally located at a highest position or a local highest position inside the equipment, that is, at the top of the condenser or the top of the compressor. At this time, a purification operation of the equipment is started. The mixture of the refrigerant and the pressure maintaining gas is pumped into the semi-permeable membrane separator in the purification loop from the top of the compressor or the top of the condenser, and by means of selective filtration by the semi-permeable membrane, one of the refrigerant and the pressure maintaining gas is filtered while the other is allowed to pass. After that, the refrigerant is cycled back to the refrigerating loop through a refrigerant outlet on the semi-permeable membrane separator, while the pressure maintaining gas passes through a pressure maintaining gas outlet on the semi-permeable membrane separator and is discharged into the atmosphere through the discharge branch.

In addition, it can be learned according to the original research and development intention of the present invention that the present invention is mainly applied to a system processing stage of a refrigerating system prior to official application, where a mixture of a refrigerant and a pressure maintaining gas still exists in the pipeline in the system processing stage. Such a case occurs mainly because the refrigeration equipment easily has the following problems in a regular transportation process:

(1) Air permeates into the system, and severely affects system performance in subsequent official running. If vacuumizing is additionally performed and the refrigerant is charged again after the equipment arrives at a transport destination, the operation difficulty and workload of the operating personnel are increased on one hand, and on the other hand, material coats are also increased (the costs of centralized purchasing are far lower than costs of minor purchasing).

(2) The problem of equipment erosion caused by permeation of moisture/air into the equipment.

Therefore, to better cooperate with the use of the refrigerating system described above, the present invention further provides a purification method for the refrigerating system, which includes the following steps:

in a first time period, performing:

S1: charging, into the refrigerating system, a refrigerant that satisfies a designed refrigerating capacity;

S2: charging a pressure maintaining gas into the refrigerating system, so that pressure in the refrigerating system is higher than atmospheric pressure; and in a second time period, performing:

S3: separating and discharging the pressure maintaining gas in the refrigerating system.

Specifically, when the method above is used for an anti-erosion purpose during a process from when manufacturing of the refrigeration equipment is completed to when the refrigeration equipment is transported to a location designated by a customer, the first time period may include: a time period from when manufacturing of the refrigerating system is completed to when the refrigerating system is ready to be loaded for transportation, and the second time period may include: a time period that is after the refrigerating system is loaded and transported to a target location and before the refrigerating system officially runs. It can be learned from the teaching of the present invention that, a desirable equipment anti-erosion effect can be achieved and excessive refrigerant leakage can be effectively avoided as long as the steps of the present invention are performed in the aforementioned time periods. On this premise, to better implement the effects of the present invention, the refrigerant and the pressure maintaining gas are charged at a moment as close to the completion of the manufacturing of the refrigerating system as possible, which can achieve better pressure maintaining, anti-leakage, and anti-erosion effects; and the gas is separated and discharged at a moment prior to the official running of the refrigerating system and as close to the official running of the refrigerating system as possible, which can also achieve better pressure maintaining, anti-leakage, and anti-erosion effects.

According to the purification method taught herein, after the refrigerating system is manufactured and before the refrigerating system shipped, the refrigerant purchased and transported in a centralized manner at the production base is first charged into the refrigerating system according to a designed refrigerating capacity; and the pressure maintaining gas is then charged into the refrigerating system, so that a pressure higher than the atmospheric pressure is maintained inside the system. After the foregoing steps are completed, the refrigeration equipment is shipped to the location designated by the customer. After settlement of the refrigerating system is finished at the designated location and before official running of the refrigerating system, the refrigerating loop and the purification loop in the refrigerating system are connected, and a purification operation is started, to implement separation of the refrigerant and the pressure maintaining gas. The separated refrigerant is delivered back to the refrigerating loop, and the pressure maintaining gas is discharged to the atmosphere. The refrigerating system can run officially after the separation operation is completed.

The method above implements multiple technical effects: first, the material costs of the refrigerant and labor costs of professional operating personnel required to charge the refrigerant are reduced; and secondly, problems such as refrigerant leakage and equipment erosion during shipment are effectively avoided.

In addition, the step of separating the pressure maintaining gas from the refrigerant may be specifically implemented in combination with different purification loops described above and by using multiple methods as described below.

Optionally, S3 includes: separating the pressure maintaining gas in the refrigerating system by means of a low temperature, and discharging the pressure maintaining gas before the refrigerating system officially runs. For a specific process, refer to the content that is described above with reference to the purification loop having the low-temperature separator.

Optionally, S3 includes: separating the pressure maintaining gas in the refrigerating system by means of pressurizing, and discharging the pressure maintaining gas before the refrigerating system officially runs. For a specific process, refer to the content that is described above with reference to the purification loop having the pressurizing separator.

Optionally, S3 includes: separating the pressure maintaining gas in the refrigerating system by means of a selective semi-permeable membrane, and discharging the pressure maintaining gas before the refrigerating system officially runs. For a specific process, refer to the content that is described above with reference to the purification loop having the semi-permeable membrane separator.

When a separation manner related to liquefaction temperatures of the refrigerant and the pressure maintaining gas (for example, low temperature separation and/or pressurizing separation) is used, to implement separation of the refrigerant and the pressure maintaining gas more desirably, the selected pressure maintaining gas should have the following properties: the pressure maintaining gas should have a liquefaction temperature lower than that of the refrigerant, and cannot chemically react with the refrigerant or the refrigerating system. More specifically, several specific embodiments of the pressure maintaining gas are provided herein for selection. For example, the pressure maintaining gas is an inert gas, nitrogen, or carbon dioxide.

The examples described above are mainly used to illustrate the refrigerating system and the purification method for the same in the present invention. Although only some implementation manners of the present invention are described, persons of ordinary skill in the art should understand that, the present invention may be implemented in many other manners without departing from the principle and scope of the present invention. Therefore, the examples and implementation manners illustrated are construed as schematic rather than restrictive, and the present invention may cover various modifications and replacements without departing from the spirit and scope defined by the appended claims.

The invention claimed is:

1. A refrigerating system, comprising:
   a refrigerating loop, comprising a compressor, a condenser, a throttling element, and an evaporator that are connected in sequence through a pipeline; and
   a purification loop, connected to the refrigerating loop and configured to separate a pressure maintaining gas in the refrigerating loop;

wherein the refrigerating loop is connected into the purification loop from a highest position or a local highest position of the refrigerating system;

wherein the purification loop comprises a purification compressor, a purification condenser, an expansion valve, and a low-temperature separator that are connected in sequence through a pipeline; and the purification loop is bi-directionally connected to the refrigerating loop through the low-temperature separator;

wherein the refrigerating loop is connected into a top of the low-temperature separator from a top of the compressor.

2. The refrigerating system according to claim 1, wherein the purification loop is connected back to the refrigerating loop from a bottom of the condenser or from a bottom of the evaporator.

3. The refrigerating system according to claim 1, wherein a bottom of the low-temperature separator is connected back to the refrigerating loop from a bottom of the condenser or a bottom of the evaporator.

4. The refrigerating system according to claim 1, wherein the purification loop further comprises: a discharge branch, configured to discharge the pressure maintaining gas separated by the low-temperature separator.

5. The refrigerating system according to claim 4, wherein the discharge branch is connected to a top of the low-temperature separator.

6. The refrigerating system according to claim 4, wherein a regeneration filter and an air pump are arranged on the discharge branch.

* * * * *